US008514235B2

(12) United States Patent
Jiao (10) Patent No.: US 8,514,235 B2
(45) Date of Patent: Aug. 20, 2013

(54) SYSTEM AND METHOD FOR MANAGING THE COMPUTATION OF GRAPHICS SHADING OPERATIONS

(75) Inventor: Yang (Jeff) Jiao, San Jose, CA (US)

(73) Assignee: Via Technologies, Inc., Taipei (TW)

( * ) Notice: Subject to any disclaimer, the term of this patent is extended or adjusted under 35 U.S.C. 154(b) by 733 days.

(21) Appl. No.: 12/764,243

(22) Filed: Apr. 21, 2010

(65) Prior Publication Data

US 2011/0261063 A1    Oct. 27, 2011

(51) Int. Cl.
*G06T 1/00*        (2006.01)
*G06F 12/02*       (2006.01)

(52) U.S. Cl.
USPC ............................. 345/543; 345/522; 711/168

(58) Field of Classification Search
USPC ........... 345/522, 543; 711/168; 712/E9.049, 712/E9.053
See application file for complete search history.

(56) References Cited

U.S. PATENT DOCUMENTS 7,454,599 B2   11/2008   Jiao et al.
7,692,660 B2   4/2010    Markovic et al.
2007/0005939 A1*  1/2007   Latorre et al. ................. 712/217
2007/0091089 A1   4/2007   Jiao et al.
2009/0153570 A1   6/2009   Jiao et al.

FOREIGN PATENT DOCUMENTS

CN    1056968 A    12/1991
CN    1928918 A    3/2007

OTHER PUBLICATIONS

English translation of abstract of CN 1928918 A.
English translation of abstract of CN 1056968 A.

\* cited by examiner

*Primary Examiner* — Xiao M. Wu
*Assistant Examiner* — Todd Buttram
(74) *Attorney, Agent, or Firm* — McClure, Qualey & Rodack, LLP (57) ABSTRACT

The present disclosure describes implementations for performing register accesses and operations in a graphics processing apparatus. In one implementation, a graphics processing apparatus comprises an execution unit for processing programmed shader operations, wherein the execution unit is configured for processing operations of a plurality of threads. The apparatus further comprises memory forming a register file that accommodates all register operations for all the threads executed by the execution unit, the memory being organized in a plurality of banks, with a first plurality of banks being allocated to a first plurality of the threads and a second plurality of banks being allocated to the remaining threads. In addition, the apparatus comprises address translation logic configured to translate logical register identifiers into physical register addresses.

15 Claims, 9 Drawing Sheets

SYSTEM AND METHOD FOR MANAGING THE COMPUTATION OF GRAPHICS SHADING OPERATIONS

CROSS REFERENCE TO RELATED APPLICATIONS

This application is related to co-pending U.S. patent application Ser. No. 11/954,621 filed Dec. 12, 2007 and entitled "TRIANGLE SETUP AND ATTRIBUTE SETUP INTEGRATION WITH PROGRAMMABLE EXECUTION UNIT," which is incorporated by reference in its entirety into the present disclosure. This application is related to co-pending U.S. patent application Ser. No. 12/764,256 filed Apr. 21, 2010, and entitled "SYSTEMS AND METHODS FOR IMPROVING THROUGHPUT OF A GRAPHICS PROCESSING UNIT," which is incorporated by reference in its entirety into the present disclosure.

BACKGROUND

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (X, Y, Z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For 3-D objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume to include or eliminate background as desired.

Once this viewing area has been selected, clipping logic eliminates the polygons (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixels are positioned in the polygon and attempts to write the associated color values and depth (Z value) into frame buffer cover. The rasterizer compares the depth (Z value) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display one scan line at a time in raster order.

Figure 1:
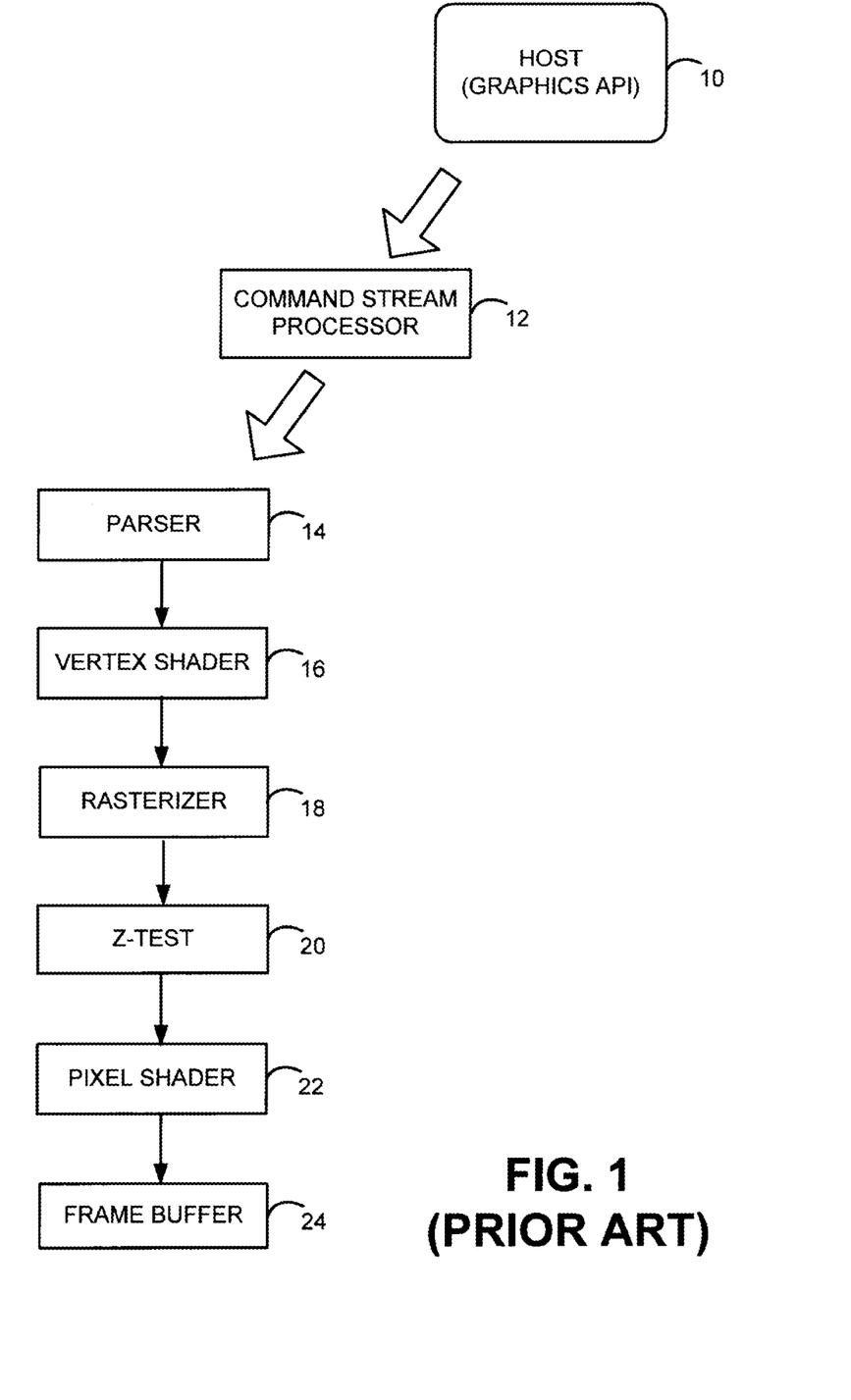
FIG. 1 is a block diagram illustrating blocks or portions of a fixed-function graphics processor, as is known in the prior art.

With this general background provided, reference is now made to FIG. 1, which shows a functional flow diagram of certain components within a graphics pipeline in a computer graphics system. It will be appreciated that components within graphics pipelines may vary among different systems, and may be illustrated in a variety of ways. As is known, a host computer 10 (or a graphics API running on a host computer) may generate a command list through a command stream processor 12. The command list comprises a series of graphics commands and data for rendering an "environment" on a graphics display. Components within the graphics pipeline may operate on the data and commands within the command list to render a screen in a graphics display.

In this regard, a parser 14 may receive commands from the command stream processor 12 and "parse" through the data to interpret commands and pass data defining graphics primitives along (or into) the graphics pipeline. In this regard, graphics primitives may be defined by location data (e.g., X, Y, Z, and W coordinates) as well as lighting and texture information. All of this information, for each primitive, may be retrieved by the parser 14 from the command stream processor 12, and passed to a vertex shader 16. As is known, the vertex shader 16 may perform various transformations on the graphics data received from the command list. In this regard, the data may be transformed from World coordinates into Model View coordinates, into Projection coordinates, and ultimately into Screen coordinates. The functional processing performed by the vertex shader 16 is known and need not be described further herein. Thereafter, the graphics data may be passed onto rasterizer 18, which operates as summarized above.

Thereafter, a Z-test 20 is performed on each pixel within the primitive. As is known, comparing a current Z-value (i.e., a Z-value for a given pixel of the current primitive) with a stored Z-value for the corresponding pixel location performs a Z-test. The stored Z-value provides the depth value for a previously rendered primitive for a given pixel location. If the current Z-value indicates a depth that is closer to the viewer's eye than the stored Z-value, then the current Z-value will replace the stored Z-value and the current graphic information (i.e., color) will replace the color information in the corresponding frame buffer pixel location (as determined by the pixel shader 22). If the current Z-value is not closer to the current viewpoint than the stored Z-value, then neither the frame buffer nor Z-buffer contents need to be replaced, as a previously rendered pixel will be deemed to be in front of the current pixel. For pixels within primitives that are rendered and determined to be closer to the viewpoint than previously-stored pixels, information relating to the primitive is passed on to the pixel shader 22, which determines color information for each of the pixels within the primitive that are determined to be closer to the current viewpoint.

Optimizing the performance of a graphics pipeline can require information relating to the source of pipeline inefficiencies. The complexity and magnitude of graphics data in a pipeline suggests that pipeline inefficiencies, delays, and bottlenecks can significantly compromise the performance of the pipeline. In this regard, identifying sources of aforementioned data flow or processing problems is beneficial.

SUMMARY

The present disclosure is directed to novel methods and apparatus for performing register accesses and operations in a graphics processing apparatus.

In one embodiment, a graphics processing apparatus comprises an execution unit for processing programmed shader operations, wherein the execution unit is configured for processing operations of a plurality of threads. The apparatus further comprises memory forming a register file that accommodates all register operations for all the threads executed by the execution unit, the memory being organized in a plurality of banks, with a first plurality of banks being allocated to a first plurality of the threads and a second plurality of banks being allocated to the remaining threads. In addition, the apparatus comprises translation logic configured to translate logical register identifiers into physical register addresses.

In another embodiment, a graphics processing apparatus comprises an execution unit for processing programmed shader operations, wherein the execution unit is configured for processing operations of a plurality of threads. The apparatus further comprises memory forming a register file that accommodates all register operations for all the threads executed by the execution unit, the memory being organized in a plurality of banks, with a first plurality of banks being allocated to a first plurality of the threads and a second plurality of banks being allocated to the remaining threads. In addition, the apparatus comprises a thread controller configured to manage thread access to registers, such that latency is minimized.

In another embodiment of a multi-threaded execution unit, a method comprises receiving a request for a logical register corresponding to a request for a register to use in carrying out a processing operation by a specified thread. The method further comprises generating a logical register identifier, the logical register identifier based at least upon data regarding the logical register and an identifier of the specified thread. The method further comprises translating the logical register identifier to a physical address identifier corresponding to the logical register request. The method also includes accessing a memory at a physical address corresponding to the physical address identifier to perform processing operations involving the register identified by the logical register identifier, the physical address of the memory accessible by the specified thread via the logical register identifier.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 2:
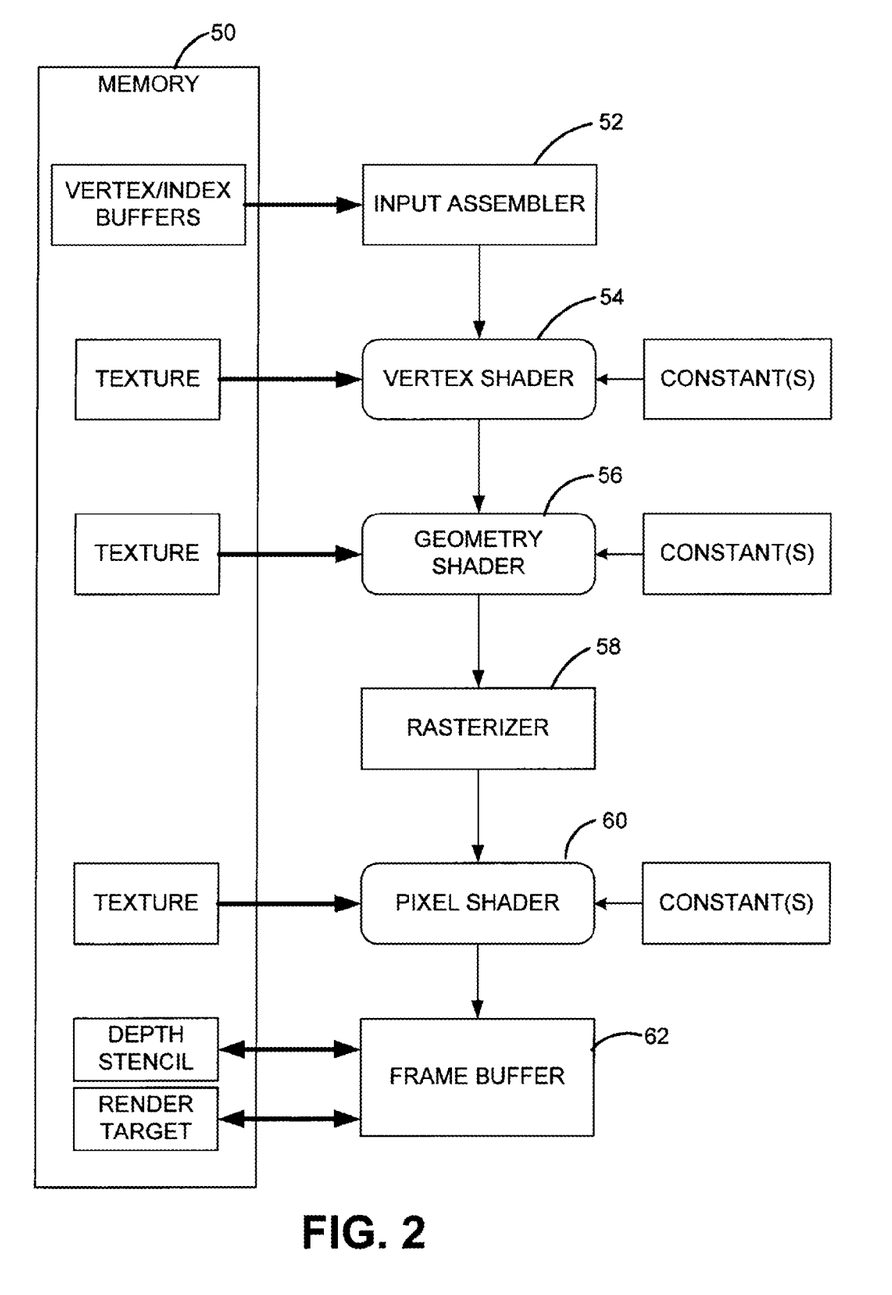
FIG. 2 is a block diagram illustrating stages or portions of a graphics processor constructed in accordance with embodiments of the invention.

Reference is now made to FIG. 2 which is a block diagram illustrating certain components in an embodiment of the invention. Specifically, the components illustrated in FIG. 2 comprise principle components of a pipelined graphics processor configured to implement or carryout embodiments of the present invention. The first component is designated as an input assembler 52, which essentially receives or reads vertices out of memory, which vertices are used to form geometry and create working items for the pipeline. In this regard, the input assembler 52 reads data from memory and from that data generates triangles, lines, points, or other primitives to be introduced into the pipeline. This geometry information, once assembled, is passed to the vertex shader 54. The vertex shader 54, as is known, processes vertices, by performing operations such as transformations, scanning, and lighting. Thereafter, the vertex shader 54 passes data to the geometry shader 56. The geometry shader 56 receives, as inputs, vertices for a full primitive, and is capable of outputting multiple vertices that form a single topology, such as a triangle strip, a line strip, point list, etc. The geometry shader 56 may be further configured to perform the various algorithms, such as tessellation, shadow volume generation, etc. The geometry shader then outputs information to a rasterizer 58, which is responsible for clipping, primitive setup, and determining when and/or how to invoke the pixel shader 60. The pixel shader 60, is invoked for each pixel covered by the primitive that is output by the rasterizer. As is known, the pixel shader 60 operates to perform interpolations and other operations that collectively determine pixel colors for output to a frame buffer 62. The functioning operation of the various components illustrated in FIG. 2 are well known to persons skilled in the art, and need not be described herein. In this regard, as will be further described herein, the present invention is directed to systems and methods for performing dynamic scheduling of a general purpose, replicated processing architecture that performs shared processing of operations and tasks of the vertex shader 54, geometry shader 56, and pixel shader 60. Therefore, the specific implementation and operation internal to these units need not be described herein to gain and appreciate a full understanding of the present invention.

Figure 3:
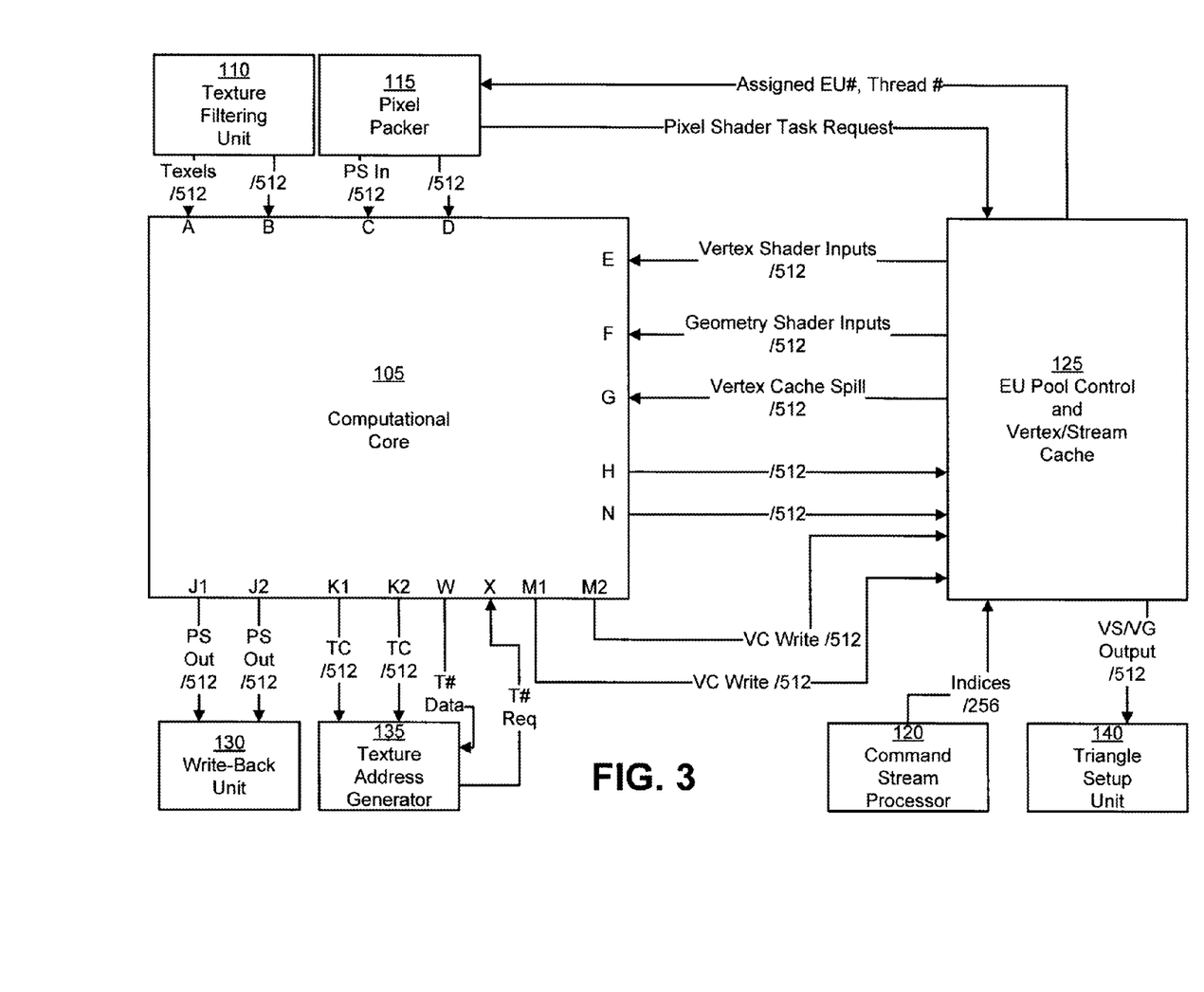
FIG. 3 is a block diagram illustrating portions of a processor environment of a graphics processor constructed in accordance with embodiments of the invention.

Reference is now made to FIG. 3, which is a block diagram showing an example processor environment for a graphics processor, constructed in accordance with embodiments of the invention. While not all components for graphics processing are shown, the components shown in FIG. 3 should be sufficient for one having ordinary skill in the art to understand the general functions and architecture related to such graphics processors. At the center of the processing environment is a computational core 105, which processes various instructions. That computational core 105, for multi-issue processors, is capable of processing multiple instructions within a single clock cycle.

As shown in FIG. 3, the relevant components of the graphics processor include the computational core 105, a texture filtering unit 110, a pixel packer 115, a command stream processor 120, a write-back unit 130, and a texture address generator 135. Also included in FIG. 3 is an execution unit (EU) pool control unit 125, which also includes a vertex cache and/or a stream cache. The computational core 105 receives inputs from various components and outputs to various other components.

For example, as shown in FIG. 3, the texture filtering unit 110 provides texel data to the computational core 105 (inputs A and B). For some embodiments, the texel data is provided as 512-bit data, thereby corresponding to the data structures defined below.

The pixel packer 115 provides pixel shader inputs to the computational core 105 (inputs C and D), also in 512-bit data format. Additionally, the pixel packer 115 requests pixel shader tasks from the EU pool control unit 125, which provides an assigned EU number and a thread number to the pixel packer 115. Since pixel packers and texture filtering units are known in the art, further discussion of these components is omitted here. While FIG. 3 shows the pixel and texel packets as 512-bit data packets, it should be appreciated that the size of the packets can be varied for other embodiments, depending on the desired performance characteristics of the graphics processor.

The command stream processor 120 provides triangle vertex indices to the EU pool control unit 125. In the embodiment of FIG. 3, the indices are 256-bits. The EU pool control unit 125 assembles vertex shader inputs from the stream cache and sends data to the computational core 105 (input E). The EU pool control unit 125 also assembles geometry shader inputs and provides those inputs to the computational core 105 (input F). The EU pool control 125 also controls the EU input 235 and the EU output 220. In other words, the EU pool control 125 controls the respective inflow and outflow to the computational core 105.

Upon processing, the computational core 105 provides pixel shader outputs (outputs J1 and J2) to the write-back unit 130. The pixel shader outputs include red/green/blue/alpha (RGBA) information, which is known in the art. Given the data structure in the disclosed embodiment, the pixel shader output may be provided as two 512-bit data streams. Other bit-widths may also be implemented in other embodiments.

Similar to the pixel shader outputs, the computational core 105 outputs texture coordinates (outputs K1 and K2), which include UVRQ information, to the texture address generator 135. The texture address generator 135 issues a texture request (T# Req) to the computational core 105 (input X), and the computational core 105 outputs (output W) the texture data (T# data) to the texture address generator 135. Since the various examples of the texture address generator 135 and the write-back unit 130 are known in the art, further discussion of those components is omitted here. Again, while the UVRQ and the RGBA are shown as 512 bits, it should be appreciated that this parameter may also be varied for other embodiments. In the embodiment of FIG. 3, the bus is separated into two 512-bit channels, with each channel holding the 128-bit RGBA color values and the 128-bit UVRQ texture coordinates for four pixels.

The computational core 105 and the EU pool control unit 125 may also transfer to each other 512-bit vertex cache spill data. Additionally, two 512-bit vertex cache writes are illustrated as output from the computational core 105 (outputs M1 and M2) to the EU pool control unit 125 for further handling.

Figure 4:
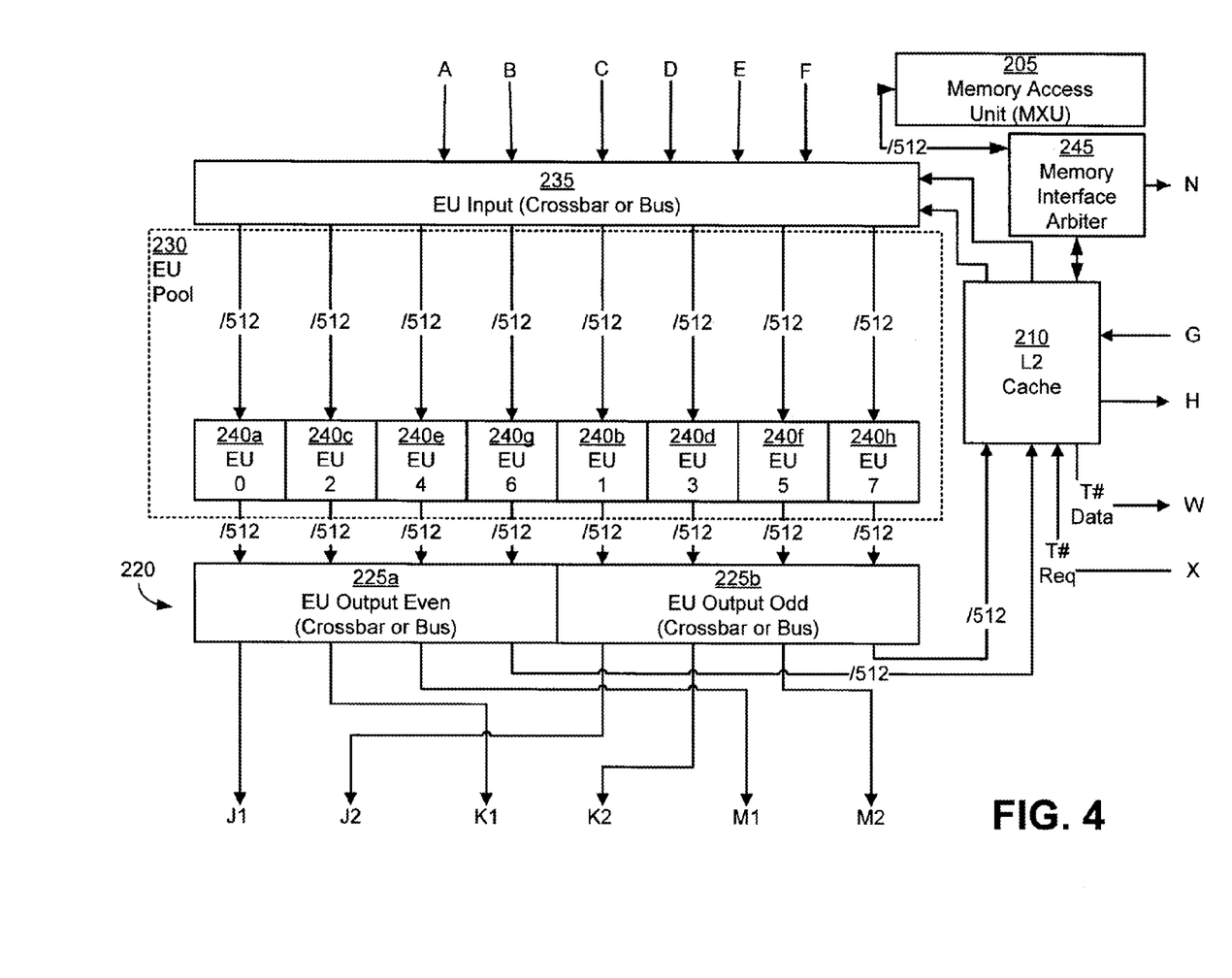
FIG. 4 is a block diagram illustrating components within the computational core of the graphics processor illustrated in FIG. 3.

Having described the data exchange external to the computational core 105, attention is turned to FIG. 4, which shows a block diagram of various components within the computational core 105. As shown in FIG. 4, the computational core 105 comprises a memory access unit 205 that is coupled to a level-2 (L2) cache 210 through a memory interface arbiter 245.

The L2 cache 210 receives vertex cache spill (input G) from the EU pool control unit 125 (FIG. 3) and provides vertex cache fetch (output H) to the EU pool control unit 125 (FIG. 3). Additionally, the L2 cache receives T# requests (input X) from the texture address generator 135 (FIG. 3), and provides the T# data (output W) to the texture address generator 135 (FIG. 3) in response to the received request.

The memory interface arbiter 245 provides a control interface to the local video memory (frame buffer). While not shown, a bus interface unit (BIU) provides an interface to the system through, for example, a PCI express bus. The memory interface arbiter 245 and BIU provide the interface between the memory and an execution unit (EU) pool L2 cache 210. For some embodiments, the EU pool L2 cache connects to the memory interface arbiter 245 and the BIU through the memory access unit 205. The memory access unit 205 translates virtual memory addresses from the L2 cache 210 and other blocks to physical memory addresses.

The memory interface arbiter 245 provides memory access (e.g., read/write access) for the L2 cache 210, fetching of instructions/constants/data/texture, direct memory access (e.g., load/store), indexing of temporary storage access, register spill, vertex cache content spill, etc.

The computational core 105 also comprises an execution unit pool 230, which includes multiple execution units (EUs) 240a . . . 240h (collectively referred to herein as 240), each of which includes an EU control and local memory (not shown). Each of the EUs 240 are capable of processing multiple instructions within a single clock cycle. Thus, the EU pool 230, at its peak, can process multiple threads substantially simultaneously. These EUs 240, and their substantially concurrent processing capacities, are described in greater detail below. While eight (8) EUs 240 are shown in FIG. 4 (labeled EU0 through EU7), it should be appreciated that the number of EUs need not be limited to eight, but may be greater or fewer in number for other embodiments.

The computational core 105 further comprises an EU input 235 and an EU output 220, which are respectively configured to provide the inputs to the EU pool 230 and receive the outputs from the EU pool 230. The EU input 235 and the EU output 220 may be crossbars or buses or other known input mechanisms.

The EU input 235 receives the vertex shader input (E) and the geometry shader input (F) from the EU pool control 125 (FIG. 3), and provides that information to the EU pool 230 for processing by the various EUs 240. Additionally, the EU input 235 receives the pixel shader input (inputs C and D) and the texel packets (inputs A and B), and conveys those packets to the EU pool 230 for processing by the various EUs 240. Additionally, the EU input 235 receives information from the L2 cache 210 (L2 read) and provides that information to the EU pool 230 as needed.

The EU output in the embodiment of FIG. 4 is divided into an even output 225a and an odd output 225b. Similar to the EU input 235, the EU output 225 can be crossbars or buses or other known architectures. The even EU output 225a handles the output from the even EUs 240a, 240c, 24e, 240g, while the odd EU output 225b handles the output from the odd EUs 240b, 240d, 240f, 240h. Collectively, the two EU outputs 225a, 225b receive the output from the EU pool 230, such as the UVRQ and the RGBA. Those outputs, among others, may be directed back to the L2 cache 210, or output from the computational core 105 to the write-back unit 130 (FIG. 3) through J1 and J2 or output to the texture address generator 135 (FIG. 3) through K1 and K2.

Having illustrated and described basic architectural components utilized by embodiments of the present invention, certain additional and/or alternative components and operational aspects of embodiments will be described. As summarized above, embodiments of the present invention are directed to systems and methods for improving the overall performance of a graphics processor. In this regard, performance of a graphics processor, as a whole, is proportionate to the quantity of data that is processed through the pipeline of the graphics processor. As described above, embodiments of the present invention utilize a programmable vertex shader, programmable geometry shader, and programmable pixel shader. Rather than implementing the functions of these components as separate shader units with different hardware designs and instruction sets, the operations are instead executed by a pool of execution units 240 with a unified instruction set. Each of these execution units is identical in design and configurable for programmed operation. In addition, each execution unit is capable of multi-threaded operation, and more specifically, for managing the operation of 64 threads simultaneously. In other embodiments, differing numbers of threads may be implemented. As various shading tasks are generated by the vertex shader 54, geometry shader 56, and pixel shader 60, those tasks are delivered to the respective execution units (via interface and scheduler) to be executed.

Figure 5:
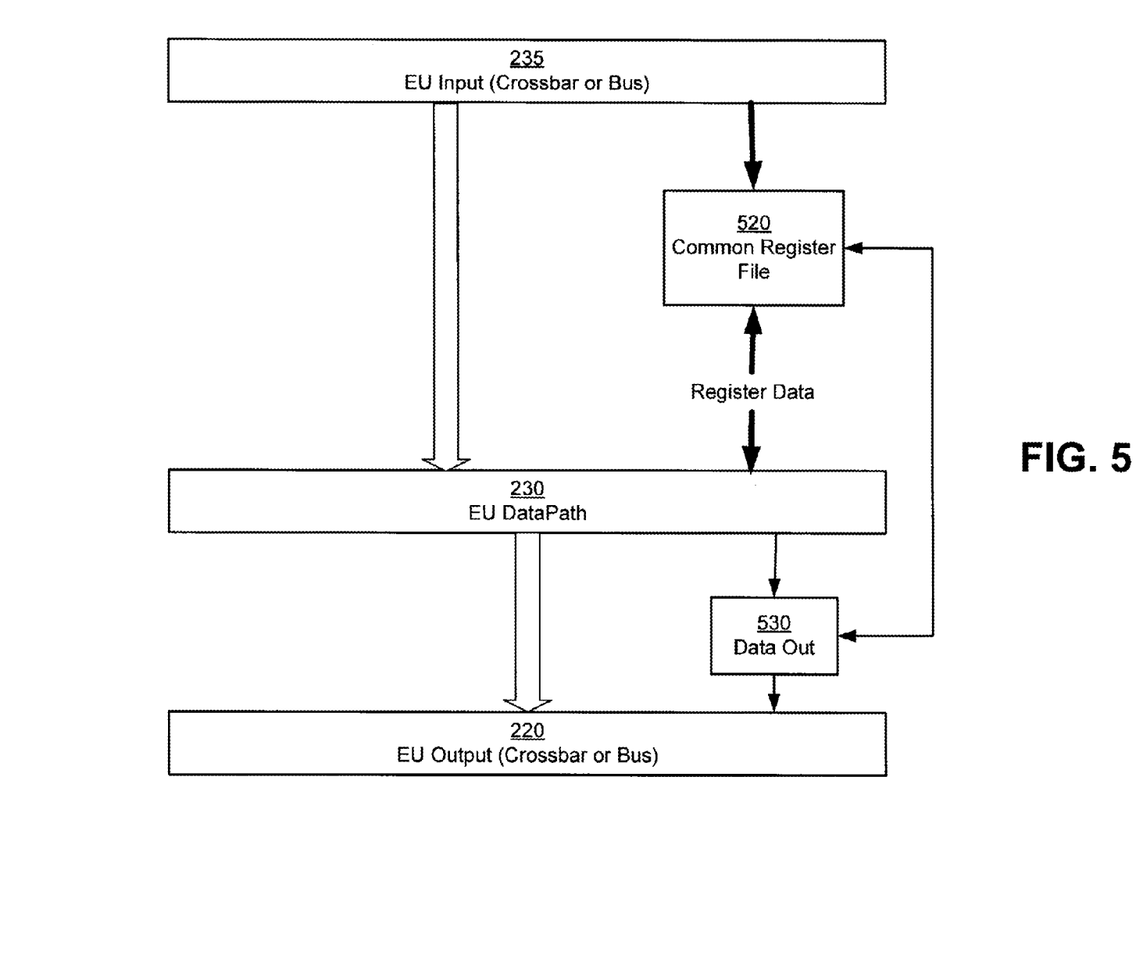
FIG. 5 is a diagram illustrating a dataflow interrelationship among a common register file, an input crossbar, an output crossbar, a datapath of processing core, and output logic.
Figure 6:
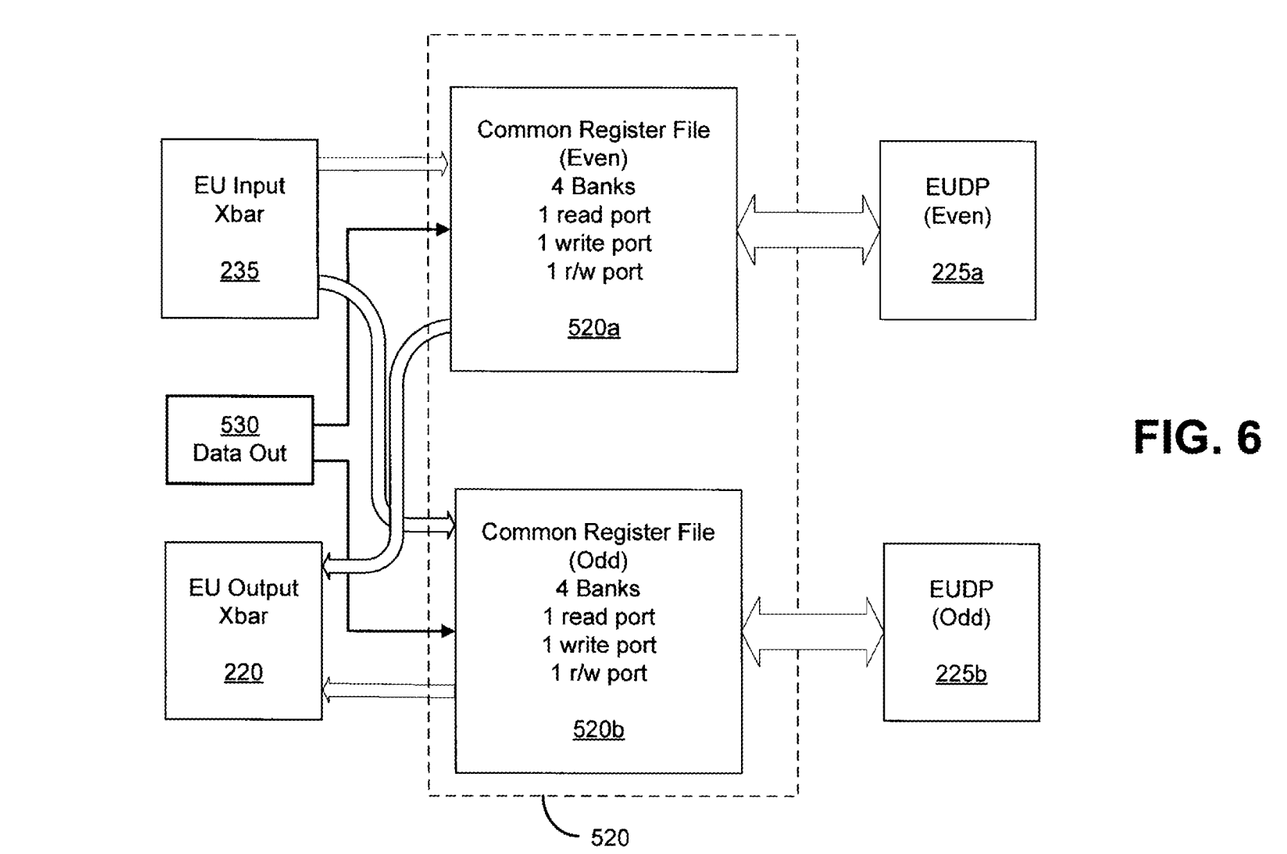
FIG. 6 is a diagram illustrating certain physical interconnections among elements illustrated in FIG. 5.
Figure 7:
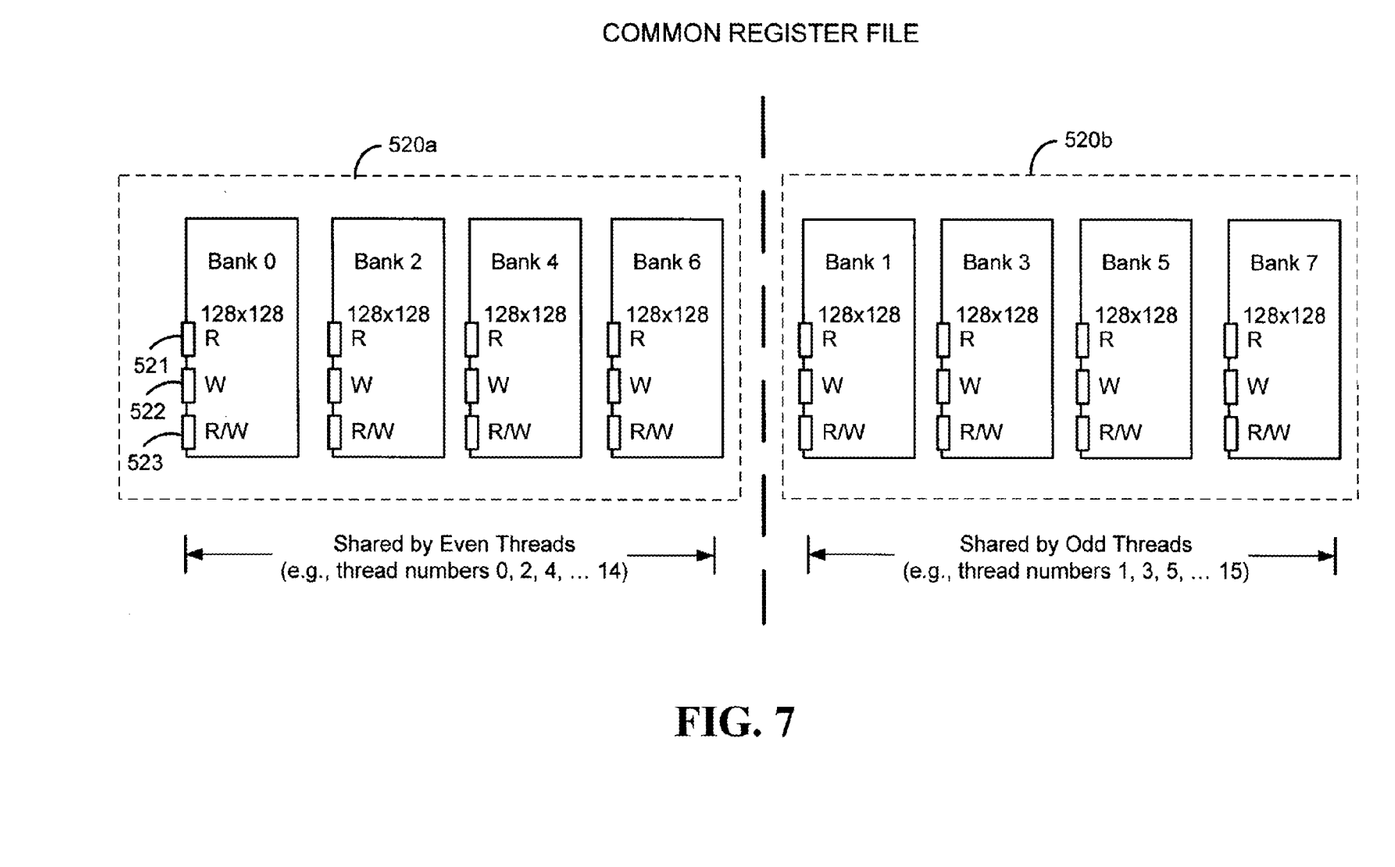
FIG. 7 is a diagram illustrating a banked memory structure for the common register file of FIGS. 5 and 6.

Embodiments of the present invention are directed to a unique hardware structure that realizes certain optimization and efficiency of the operating environment described above. In this regard, embodiments of the invention are directed to a component structure providing and supporting a common register storage area (also referred to herein as a common register file) that is shared by the multiple threads of an execution unit. FIGS. 5, 6, and 7 collectively illustrate a novel hardware structure for one embodiment of the invention.

Reference is made to FIG. 5, which is a block diagram that illustrates a functional location of the common register file 520, in relation to the EU input crossbar 235 and the EU datapath 230. In FIG. 4, multiple execution units (EUs) were illustrated. In FIG. 5, only one such EU 230 is illustrated. One or more common register file 520 can support each EU 230 in the pool of EUs. The EU data path (EUDP) comprises the hardware or circuitry to perform the calculations that are carried out by the EU 230. Among other components this hardware may include arithmetic logic units (ALUs—floating point and/or fixed point), limited memory, dedicated computational hardware, etc. As such processing circuitry is well known, it need not be described herein. Indeed, consistent with the scope and spirit of the invention, the execution units 240 may comprise various forms and components of processing hardware and logic.

Logic 530 is provided for data that is output from the EUDP 230. From logic 530, data can be directed to the output crossbar 220 or back to the common register file 520.

Reference is now made to FIG. 6. As illustrated, in one embodiment, the common register file 520 is divided into two portions, with one portion 520a being allocated to all even numbered threads and the other portion 520b being allocated to all odd numbered threads. In a manner similar to the grouping of EUs (described in FIG. 4) in even and odd groupings, the threads may be grouped in even and odd groupings. With such a grouping, FIG. 6 illustrates interconnections for dataflow among the EU input crossbar 235, the EU output crossbar 220, the EU data path 225, the output logic 530, and the common register file 520.

In a preferred embodiment, the common register file 520 is further subdivided into banks. As illustrated in FIG. 7, each half (the even half 520a and the odd half 520b) of the common register file 520 is further partitioned into four banks of memory. Certain benefits of this particular structure will be described below. Each of the eight memory banks includes 1 read port 521, one write port 522, and one read/write port 523. Additional or fewer ports may be implemented. As additional ports are added to memory, the associated cost is typically driven up, due to required arbitration and other logic. As fewer ports are implemented, then overall speed is compromised (as pending reads and writes may have to wait, as other read/writes are taking place through a given port).

As illustrated, the common register file is partitioned into 8 banks. Bank numbers 0, 2, 4, and 6 are shared among the even number threads (i.e., threads 0, 2, ... 14) and banks 1, 3, 5, and 7 are shared among the odd number threads (i.e., threads 1, 3, ... 15). For each memory bank, the read port 521 and write port 522 are used by the EU data path 230 for read and write access initiated by instruction execution. The thread controller (see FIG. 8) is responsible for pairing instructions from different threads in a manner that minimizes latency and also minimizes any read or write conflict at any given memory bank. Avoidance (or minimization) of source conflict within any given thread context is generally handled at the compiler level.

The read/write portion 523 is used by the EU input and EU output control logic for loading the initial thread input data and writing the final thread output to EU pool or other modules. Using separate ports for the EU data path 230 and EU I/O read/write access allows loading/unloading of thread inputs/outputs and execution of threads to be done in parallel. It also avoids unnecessary arbitration between EU data path 230 and I/O requests, which could significantly increase hardware complexity.

The read/write port 523 is shared by both EU input and output, and writes are assigned a higher priority than reads. The 512-bit of the input data (512 bits across the four 128 bit memory banks) has to go to four different banks to avoid conflict when loading data into CRF. A two-bit channel index is passed in along with the data and 512-bit aligned base address to specify the starting bank of the input data. For example, if the starting channel index is 1, then the first 128-bits from the LSB (least significant bit) is loaded into bank 1, the next 128 bits is loaded into bank 2, . . . and the last 128 bits is loaded into bank 0 (assuming the thread based bank offset is 0). In some embodiments, the two LSBs of the thread ID may be used to generate a bank offset to randomize the starting bank location for each thread.

As the physical memory space provided within the common register file 520 is typically smaller than the register foot print, and is certainly smaller than the definable register space, an appropriate conversion or translation is performed between logical register identifiers (e.g., the register identifiers provided by the software) and the physical register address space of the common register file 520. One way of managing this translation is to treat the memory space within the common register file 520 similar to a cache memory space, with translation logic providing the address conversion, much like cache tag addressing provides access to space within a cache memory or translation lookaside buffer (TLB) in virtual memory mechanism. One implementation embodying logic for performing such a conversion will be specifically described below in connection with FIG. 8.

It should be appreciated that, consistent with the scope and spirit of the invention, various alternative structures can be utilized or implemented. For example, each memory bank may be of a different size than 128 bits by 128 bits. Likewise, each memory bank may have additional or fewer read ports, write ports, and read/write ports. In addition, additional or fewer memory banks may be implements. The particular structure illustrated and described herein has been selected for illustration because it has been found to offer certain overall performance and cost advantages, based on a variety of design considerations.

As mentioned above, the execution units are provided to process shader programs (vertex shader programs, geometry shader programs, and pixel shader programs). As is known, each shader is a program defined by software. The program code (selected by the software designer) allocates registers for the program. For example, a pixel shader program may define certain input, output, and temporary registers as illustrated in the following pseudocode segment:

---
Pixel shader( )
   Input regs (V0 ~ V15)
   Output regs (O0 ~ O31)
   Temp regs (T0 ~ T31)
   . . .
   . . .
end( )
---

In such a program, a total of 80 registers are required. Designing a register file large enough to hold all of those registers (for 32 threads), would require a register file of 2,560 register locations. Such a design would require a more expensive memory area, and in addition would yield inefficient memory space utilization (as typically only a fraction of the registers are in use at a given time).

Instead, a compiler for the shader programs can evaluate the shader programs to determine the maximum size (or footprint) of the required logical register space over the lifetime of the program. That is, the compiler can determine the maximum number of threads to be utilized at any given time during the program execution. Memory allocation could be designed to provide just enough physical register space to accommodate the maximum footprint for all threads. In the above example, the shader registers can be mapped to a physical register space. However, such an approach would again generally result in an over-allocation, as not all threads are used at a given time, and certainly not all threads would be used at maximum register usage at a given instant. If, however, if the memory allocation is made too small, then inefficiency will result from swapping values between the relatively high-speed register file and system memory.

Accordingly, the compiler for the shader programs may allocate physical registers for a certain usage required by a shader execution, such as, for example, an input register. When such an input register has been read and is no longer needed for use as an input register, the physical register used for such an input can be remapped for another use, such as a temporary or output register. As an alternative non-limiting example, the compiler may allocate a physical register for usage as a temporary register for storage of a value that is manipulated or calculated by the shader program. Once the value in the temporary register is manipulated or calculated by the shader program and is ready for output, the physical register allocated for usage as a temporary register can be remapped as an output register.

The particular banked structure described herein reflects a determined tradeoff of these and other design considerations. For example, the relatively small size of each memory, along with the read and write ports, essentially realizes the equivalent of larger memories with multiple ports (but at a lower cost). Further, the banked structure allows the thread compiler to minimize certain instruction latencies.

As an example, consider an instruction such as: R2←R0, R1, which adds the contents of register R0 with register R1, and places the result in R2. The thread controller (FIG. 8) can be structured to ensure that the registers are stored in different memory banks. That way, the value of R0 and R1 may be read from respective read ports 521 simultaneously.

Figure 8:
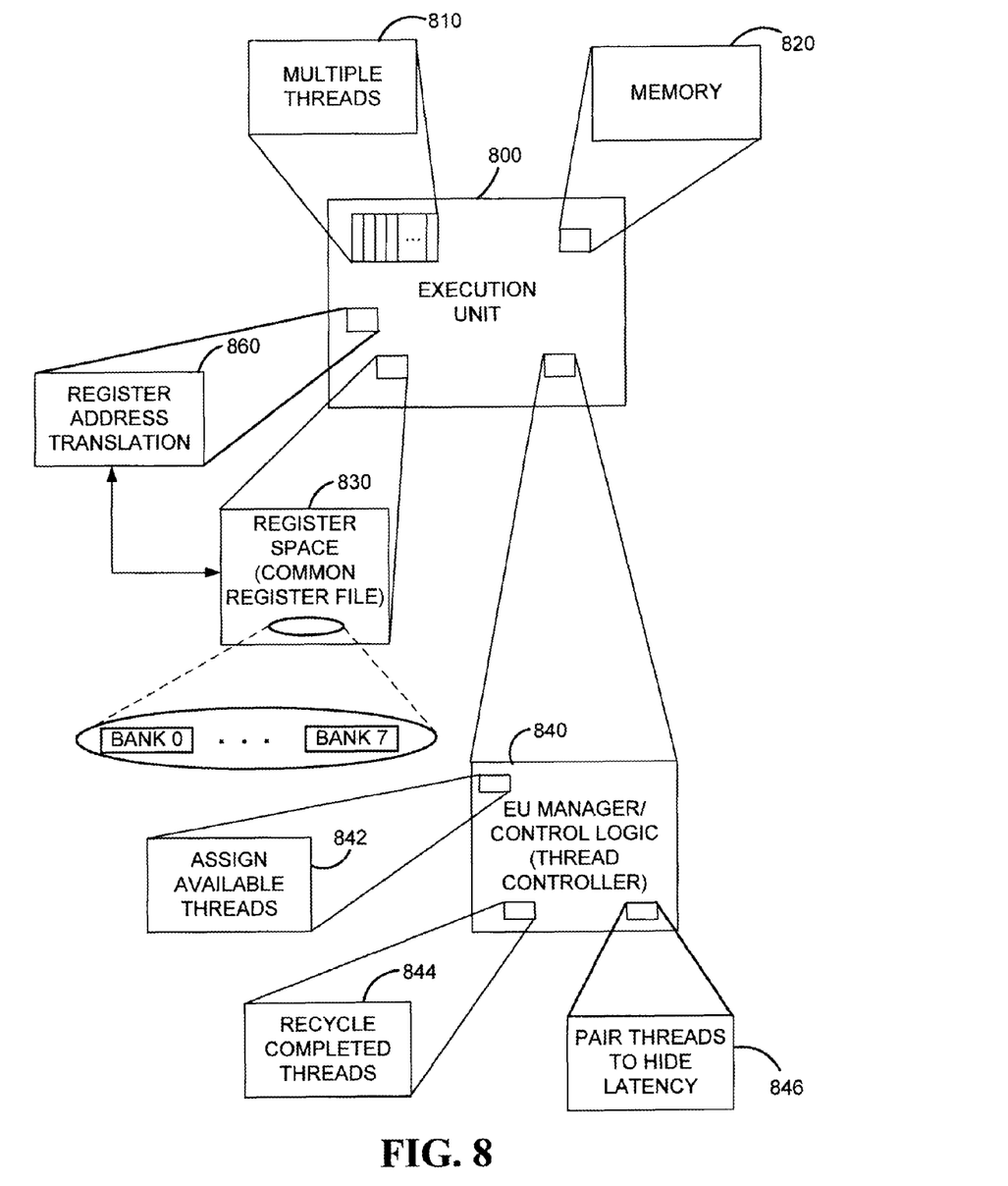
FIG. 8 is a block diagram illustrating certain components within an execution unit of an embodiment of the invention.

Reference is now made to FIG. 8, which is a block diagram illustrating certain units or logic within an execution unit 800 of an embodiment of the invention. As described above, each execution unit 800 includes the requisite logic or circuitry 810 for executing a plurality of independent threads. In one embodiment, each execution unit 800 has the requisite logic and circuitry for executing 32 independent, parallel threads. Other embodiments may support additional or fewer threads. Each execution unit 800 further includes memory resources 820, as well as register space 830. In addition, each execution unit 800 includes thread control logic (e.g., thread controller) or an execution unit manager 840. The execution unit manager 840 is designed to manage and control various operation of the execution unit, from carrying out various functions and features described herein. For example, the execution manager 840 includes logic 842 configured to assign available threads for carrying out tasks that are assigned to the execution unit. This assignment of threads includes the association or assignment of various resources (including memory and registers) for supporting the operation of the thread.

Likewise, the execution unit manager 840 includes logic 844 to recycle threads for subsequent tasks, once the assigned task is completed. The execution unit manager 840 may also include logic 846 that is configured to pair threads so as to hide or minimize latency. For example, a read-modify-write instruction may require multiple cycles for execution, because a register value must first be read from the register file 830 (reference number 520 in previously described embodiments) and passed to the EU data path for computation (e.g., modify). Then, in a later cycle, the value is written back to the register file 830. During the modify cycle, however, other data may be transferred or communicated through the memory ports (that is, register file accesses take place for the other instruction while the EU data path is executing the modify operation). Therefore, the logic 846 may be configured to pair instructions in this way, so as to minimize instruction latency, by maximizing the throughput or utilization of the register file read and write ports.

As previously described, the overall size of the memory space of the common register file 830 is selected based on certain design and performance tradeoffs. The memory space, however, is typically smaller than the combined maximum footprint size of the shader programs (combined for all threads). As also previously described, one manner of handling the conversion or translation between logical register identifiers and the physical register space of the common register file is similar to the implementation of memory space within a cache memory. For example, registers can be allocated for usage as and when they are needed by execution of a shader program. In other words, register allocation and subsequent release of register resources can be accomplished by employing a cache hit test scheme. As a result, physical registers may not be allocated or assigned to a logical register use until it is needed by the shader program. For instance, in the above non-limiting pseudocode example, despite the fact that logical registers are defined by the shader program, such logical registers may not be assigned to a physical register in hardware until the register is actually needed for execution of the shader program. As the memory space is banked, however, there are certain constraints on (or requirements of) such an approach.

Therefore, logic 860 is provided to translate logical register identifiers (or addresses) into physical register identifiers (or addresses). Table 1 (below) illustrates an exemplary structure or mapping for the register translation.

of memory usage of the common register file 830, to guarantee there is enough available register space before scheduling a new task to an available thread of the execution unit. This will ensure that there are always free lines available when write allocation occurs, and thus the registers will never overlap. Additionally, register resources can be freed according the assigned tag, which includes the thread ID, so that all physical registers used for a particular thread can be released substantially simultaneously for usage by other threads executing within the hardware.

Figure 9:
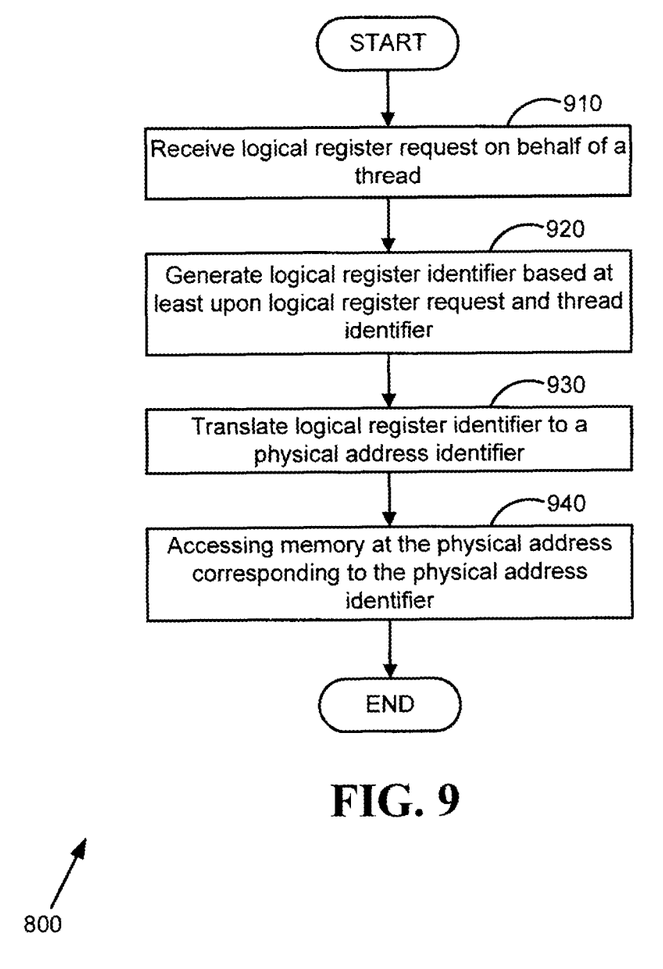
FIG. 9 is a flow diagram illustrating a method in accordance with an embodiment of the invention.

Referring next to FIG. 9, shown is a flowchart that provides one example of the operation of an execution unit 800 (FIG. 8) according to an embodiment of the present disclosure. The flowchart can also be viewed as representing a method in accordance with the disclosure. It should be appreciated that the depicted steps do not represent all aspects of the operation of an execution unit 800 according to an embodiment of the disclosure. Rather, the depicted steps represent steps included in one embodiment of logic of an execution unit 800 that can allocate entries in a common register file 830 (FIG. 8) and provide address translation as described herein.

To this end, in box 910, a request for a register is received. A request for a register can be received on behalf of a thread executed in the execution unit 800. In other words, a thread may request a register by providing a request for a logical register (e.g., a thread identifier provided by software executed in a thread). In box 920, the execution unit 800 can generate a logical register identifier corresponding to a register requested by a particular thread. As noted above, in some embodiments, the logical register identifier can include a thread identifier and data regarding the logical register requested by software executed in the thread. In this way, a unique logical register identifier can be generated that corresponds to the logical register requested by the thread. In one

TABLE 1

| 12 | 11 | 10 | 9 | 8 | 7 | 6 | 5 | 4 | 3 | 2 | 1 | 0 |
|---|---|---|---|---|---|---|---|---|---|---|---|---|
| Thread ID | | | | | CRF Index | | | | | | | |
| Tag 4 MSBs | | | | Even/Odd | Tag 5 LSBs | | | | | Word Sel | Bank Select | |

The CRF register index (e.g., program register identifier) along with the thread ID can be used to construct a unique logical address for tag matching in reading and writing data in CRF. The format of the address is aligned to 128-bits, which is the width of the memory banks (see FIG. 7). The 13 bits of the address is constructed from combining the 8-bit CRF register index and the 5-bit thread ID (as the 5 bit thread ID identifies the relevant thread—of the 32 possible threads) to create a unique address for an entry within the common register file 830.

In one embodiment, each 1024-bit line has a tag, and there are two 512-bit entries (words) on each line. Each word is stored across four banks and the two LSBs of CRF index are added to the bank offset of current thread to create the bank selection.

The tag matching scheme allows the registers of different threads to share a single, common register file 830 (rather than a distinct register file for each thread). However, register allocation within a common register file 830 need not be contiguous for a particular thread, as registers can be allocated and/or released as and when they are needed and identifiable by a tag as described above. This makes efficient utilization of available memory space. Further, an EU Pool resource monitor (not specifically illustrated) may keep track embodiment, a thread identifier and data regarding the logical register can be concatenated to create a logical register identifier unique to a particular logical register requested by a thread.

In box 930, the execution unit 800 can translate the logical register identifier generated in box 920 into a physical address identifier. In other words, the execution unit 800 can assign a physical register or memory location to the logical register identifier. This allows a particular entry of a common register file 830 to be assigned to a particular operation of a thread when a register is requested by the thread. In one embodiment, the register address translation logic 860 of the execution unit 800 can perform address translation as described in this step. Accordingly, in box 940, the execution unit 800 can allow a register or memory location in the common register file 830 to be accessible by a thread via a logical register identifier.

As will be appreciated by persons skilled in the art, additional components may also be included within an execution unit for carrying out various tasks and operations, consistent with the description of the embodiments provided herein.

As used herein, the term "logic" is defined to mean dedicated hardware (i.e., electronic or semiconductor circuitry), as well as general purpose hardware that is programmed through software to carry out certain dedicated or defined functions or operations.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure. For example, in one embodiment, a graphics processing apparatus comprises an execution unit for processing programmed shader operations, wherein the execution unit is configured for processing operations of a plurality of threads. The apparatus further comprises memory forming a register file that accommodates all register operations for all the threads executed by the execution unit, the memory being organized in a plurality of banks, with a first plurality of banks being allocated to a first plurality of the threads and a second plurality of banks being allocated to the remaining threads. In addition, the apparatus comprises translation logic configured to translate logical register identifiers into physical register addresses.

In another embodiment, a graphics processing apparatus comprises an execution unit for processing programmed shader operations, wherein the execution unit is configured for processing operations of a plurality of threads. The apparatus further comprises memory forming a register file that accommodates all register operations for all the threads executed by the execution unit, the memory being organized in a plurality of banks, with a first plurality of banks being allocated to a first plurality of the threads and a second plurality of banks being allocated to the remaining threads. In addition, the apparatus comprises a thread controller configured to manage thread access to registers, such that latency is minimized.

In another embodiment a multi-threaded execution unit, a method comprises receiving a logical register identification of a register for use in carrying out a processing operation by a specified thread and combining the logical register identification with an identifier of the specified thread to generate a physical address identifier for the logical register. The method further comprises accessing a memory at the physical address to perform processing operations involving the register identified by the logical register identification.

What is claimed is:

1. A graphics processing apparatus comprising:
   an execution unit for processing programmed shader operations, wherein the execution unit is configured for processing operations of a plurality of threads;
   memory forming a register file that accommodates all register operations for all the threads executed by the execution unit, the memory being organized in a plurality of banks, with a first plurality of banks being allocated to a first plurality of the threads and a second plurality of banks being allocated to the remaining threads;
   allocation logic configured to allocate and release registers within the register file in response to requests for logical registers by one of the plurality of threads; and
   translation logic configured to translate logical register identifiers into physical register addresses,
   wherein a logical register identifier includes a thread identifier identifying a thread executed within the execution unit and a register index identifying a location within the register file; and
   wherein the allocation logic is configured to pair instructions such that successive accesses of the memory may be performed by different threads, so that processing of a register operation of one thread may be performed at the same time that a register access from another thread takes place.

2. The graphics processing apparatus of claim 1, wherein the memory is organized into eight banks, with four banks being allocated to the first plurality of the threads and four banks being allocated to the remaining threads.

3. The graphics processing apparatus of claim 2, wherein the first plurality of threads are the odd numbered threads and the remaining threads are the even numbered threads.

4. The graphics processing apparatus of claim 1, wherein each bank of the memory has a single read port, a single write port, and a single read/write port.

5. The graphics processing apparatus of claim 1, wherein the translation logic is configured to perform a mapping of a logical register identifier to a physical register address within the memory, utilizing the thread identifier and the register index specified by software that defines the programmed shader operation.

6. The graphics processing apparatus of claim 5, wherein the thread identifier is a 5-bit number specifying one of a plurality of possible threads being executed by the execution unit and wherein the register index is an 8-bit number.

7. A graphics processing apparatus comprising:
   an execution unit for processing programmed shader operations, wherein the execution unit is configured for processing operations of a plurality of threads;
   memory forming a register file that accommodates all register operations for all the threads executed by the execution unit, the memory being organized in a plurality of banks, with a first plurality of banks being allocated to a first plurality of the threads and a second plurality of banks being allocated to the remaining threads;
   a thread controller configured to manage thread access to registers, and configured to generate requests for a logical register for a particular thread; and
   translation logic configured to translate a logical register identifier into a physical register address;
   wherein a logical register identifier includes a thread identifier identifying a thread executed within the execution unit and a register index identifying a location within the register file; and
   wherein the thread controller is configured to pair instructions such that successive accesses of the memory may be performed by different threads, so that processing of a register operation of one thread may be performed at the same time that a register access from another thread takes place.

8. The graphics processing apparatus of claim 7, wherein the memory is organized into eight banks, with four banks being allocated to the first plurality of the threads and four banks being allocated to the remaining threads.

9. The graphics processing apparatus of claim 8, wherein the first plurality of threads are the odd numbered threads and the remaining threads are the even numbered threads.

10. The graphics processing apparatus of claim 7, wherein each bank of the memory has a single read port, a single write port, and a single read/write port.

11. The graphics processing apparatus of claim 7, wherein the translation logic is configured to perform a mapping of a logical register identifier to a physical register address within the memory, utilizing the thread identifier and the register index specified by software that defines the programmed shader operation.

12. The graphics processing apparatus of claim 11, wherein the thread identifier is a 5-bit number specifying one of a plurality of possible threads being executed by the execution unit and wherein a CRF Index is an 8-bit number specifying the register index.

13. In a multi-threaded execution unit, a method comprising:
receiving a request for a logical register corresponding to a request for a register to use in carrying out a processing operation by a specified thread;
generating a logical register identifier, the logical register identifier based at least upon data regarding the logical register and an identifier of the specified thread;
translating the logical register identifier to a physical address identifier corresponding to the logical register request;
accessing a memory at a physical address corresponding to the physical address identifier to perform processing operations involving the register identified by the logical register identifier, the physical address of the memory accessible by the specified thread via the logical register identifier; and
pairing instructions such that successive accesses of the memory may be performed by different threads, so that processing of a register operation of one thread may be performed at the same time that a register access from another thread takes place.

14. The method of claim 13, further comprising the step of concatenating data regarding the logical register with a bit representation of the specified thread.

15. The method of claim 14, wherein the identifier of the specified thread is a 5-bit number specifying one of a plurality of possible threads being executed by the execution unit and the data regarding the logical register is an 8-bit number specifying a logical register index.

* * * * *